US008886752B2

(12) United States Patent
Styles

(10) Patent No.: US 8,886,752 B2
(45) Date of Patent: Nov. 11, 2014

(54) SYSTEM AND METHOD FOR OPTIMIZING TRANSFERS OF DOWNLOADABLE CONTENT

(75) Inventor: Andrew G. Styles, San Diego, CA (US)

(73) Assignee: Sony Computer Entertainment America, San Mateo, CA (US)

( * ) Notice: Subject to any disclaimer, the term of this patent is extended or adjusted under 35 U.S.C. 154(b) by 81 days.

(21) Appl. No.: 13/300,966

(22) Filed: Nov. 21, 2011

(65) Prior Publication Data
US 2013/0132509 A1    May 23, 2013

(51) Int. Cl.
G06F 15/16    (2006.01)
H04L 29/08    (2006.01)
G06F 17/30    (2006.01)

(52) U.S. Cl.
CPC .......... *H04L 67/06* (2013.01); *G06F 17/30772* (2013.01); *G06F 17/30017* (2013.01)
USPC ....................................................... 709/217

(58) Field of Classification Search
CPC ............... G06F 17/30017; G06F 17/30772; G06F 17/30053; G11B 2020/10768; H04L 65/4084
USPC ....................................................... 709/217
See application file for complete search history.

(56) References Cited

U.S. PATENT DOCUMENTS

| 6,820,133 | B1  |         | 11/2004 | Grove et al. |         |
|-----------|-----|---------|---------|--------------|---------|
| 6,959,318 | B1  | *       | 10/2005 | Tso          | 709/203 |
| 7,797,064 | B2  | *       | 9/2010  | Loomis et al. | 700/94 |
| 2002/0083118 | A1 | *    | 6/2002  | Sim          | 709/105 |
| 2003/0061602 | A1 | *    | 3/2003  | Graham et al. | 717/148 |
| 2004/0049639 | A1 | *    | 3/2004  | So et al.    | 711/137 |
| 2006/0212524 | A1 | *    | 9/2006  | Wu et al.    | 709/206 |
| 2007/0112973 | A1 | *    | 5/2007  | Harris et al. | 709/232 |
| 2009/0070556 | A1 | *    | 3/2009  | Griswell et al. | 712/207 |
| 2011/0238738 | A1 | *    | 9/2011  | Wu et al.    | 709/203 |
| 2012/0054235 | A1 | *    | 3/2012  | Kitazato et al. | 707/770 |

OTHER PUBLICATIONS

International Search Report and the Written Opinion of the International Search Authority for Application No. PCT/US12/63988, mailed on Jan. 31, 2013.

* cited by examiner

*Primary Examiner* — Larry Donaghue
(74) *Attorney, Agent, or Firm* — Nixon Peabody, LLP; Khaled Shami

(57) ABSTRACT

A system and method for optimizing transfers of downloadable content is described. Embodiments of the invention begin to execute downloadable content before the content is downloaded in full, providing users with faster access to the content. In addition, embodiments disclosed herein reduce bandwidth usage, are less sensitive to consumer internet speed, and are not limited by end-user product storage size. The embodiments are dynamic, thus expanding application of the system and method to both static and interactive content. The disclosed embodiments can be implemented with a patch or driver on the operating system of the user device, rendering it unnecessary to heavily modify the source code of the content. Disclosed embodiments can also operate independent from and/or invisible to the executing content, minimizing the amount of errors observed by a user when the content is displayed.

36 Claims, 6 Drawing Sheets

SYSTEM AND METHOD FOR OPTIMIZING TRANSFERS OF DOWNLOADABLE CONTENT

FIELD

The present disclosure relates generally to downloadable content delivery, and more particularly, to systems and methods for optimizing transfers of downloadable content.

BACKGROUND

In recent years, computing devices have developed universal appeal as a primary source of information, entertainment and communication. End-user products integrating these devices, such as televisions, DVD players, game consoles, computers and the like, are created, changed and refined to facilitate consumer access to digital content of all sizes and types. Such digital content is often distributed on physical media, such as CDs, DVDs, and Blu-rays discs (BDd), but are limited to the storage size of the physical media on which it is contained. Further, physical media requires that the consumers either visit a brick-and-mortar store location to acquire the content, or else have the media physically delivered to them. In either case, actual, physical possession of the media is required, delaying access to and enjoyment of the digital content. In addition, physical media is vulnerable to damage, such as scratching, breaking, and general wear-and-tear, as well as manufacturing variances and defects. Such problems can cause loading delays, errors, or can even render the digital content inaccessible.

Thus, content developers and manufacturers have begun to distribute digital content through the Internet, which resolves many of the above problems associated with physical media. For example, consumers are not required to obtain possession of a physical medium from a store or other source, and can instead download content in the comfort of their own home. This allows consumers to acquire a variety of digital content, such as pictures, music, games, television shows, movies, applications, upgrades, additional features, etc., with a single click of a button. However, the size of the downloadable content can be limited by available bandwidth, consumer internet speed, and the storage size of the end-user product executing the content. Further, execution of many types of content requires that it be downloaded in full prior to execution, again delaying the consumer's access to and enjoyment of the desired content.

SUMMARY

Thus, there is a continuous and ongoing need for novel and improved systems and methods for transferring digital content over the Internet that reduces bandwidth usage, is less sensitive to consumer internet speed, is not limited by end-user product storage size, and provides faster access to the content. Embodiments of the invention meet these needs and other by providing a system and method for optimizing transfers of downloadable content that allow execution of the content to begin before it is downloaded in its entirely. The embodiments described herein are dynamic, thus expanding its application to both static and interactive content. Further, one or more of the disclosed embodiments can be implemented with a patch or driver on the operating system of the user device, rendering it unnecessary to heavily modify the source code of the content. Disclosed embodiments can also operate independent from and/or invisible to the executing content. This minimizes the amount of errors observed by users when the content is displayed.

According to an embodiment of the invention, a method for optimizing transfers of downloadable content is described. The method comprises receiving a first local request for a first portion of a plurality of portions of the downloadable content, translating the first local request into a first remote request for the first portion of the downloadable content, transmitting the first remote request, receiving the first portion of the downloadable content, storing the first portion of the downloadable content, and executing the first portion of the downloadable content. According to another embodiment, a computer readable medium having computer executable instructed embedded thereon for performing the acts of this method is described.

Systems for effecting this method are also described herein according to an embodiment of the invention. For example, a system for optimizing transfers of downloadable content is described. The system comprises a processor and a memory. The processor is operable to receive a first local request for a first portion of a plurality of portions of the downloadable content, translate the first local request into a first remote request for the first portion of the downloadable content, transmit the first remote request over a network, receive the first portion of the downloadable content over the network, and execute the first portion of the downloadable content. The memory is operable to store at least one portion of the plurality of portions of the downloadable content.

A system for optimizing transfers of downloadable content using modules is also described in an embodiment. The system comprises a translation module operable to translate a first local request for a first portion of a plurality of portions of the downloadable content into a first remote request for the first portion of the downloadable content; a communication module operable to receive the first local request, transmit the first remote request, and receive the first portion of the downloadable content; an execution module operable to execute the first portion of the downloadable content; and a storage module operable to store at least one portion of the plurality of portions of the downloadable content.

DETAILED DESCRIPTION

A system and method for optimizing transfers of downloadable content is described. In the following description, for purposes of explanation, numerous specific details are set forth in order to provide a thorough understanding of the exemplary embodiments. It is apparent to one skilled in the art, however, that embodiments of the present invention can be practiced without these specific details or with an equivalent arrangement. In some instances, well-known structures and devices are shown in block diagram form in order to avoid unnecessarily obscuring the embodiments.

Figure 1:
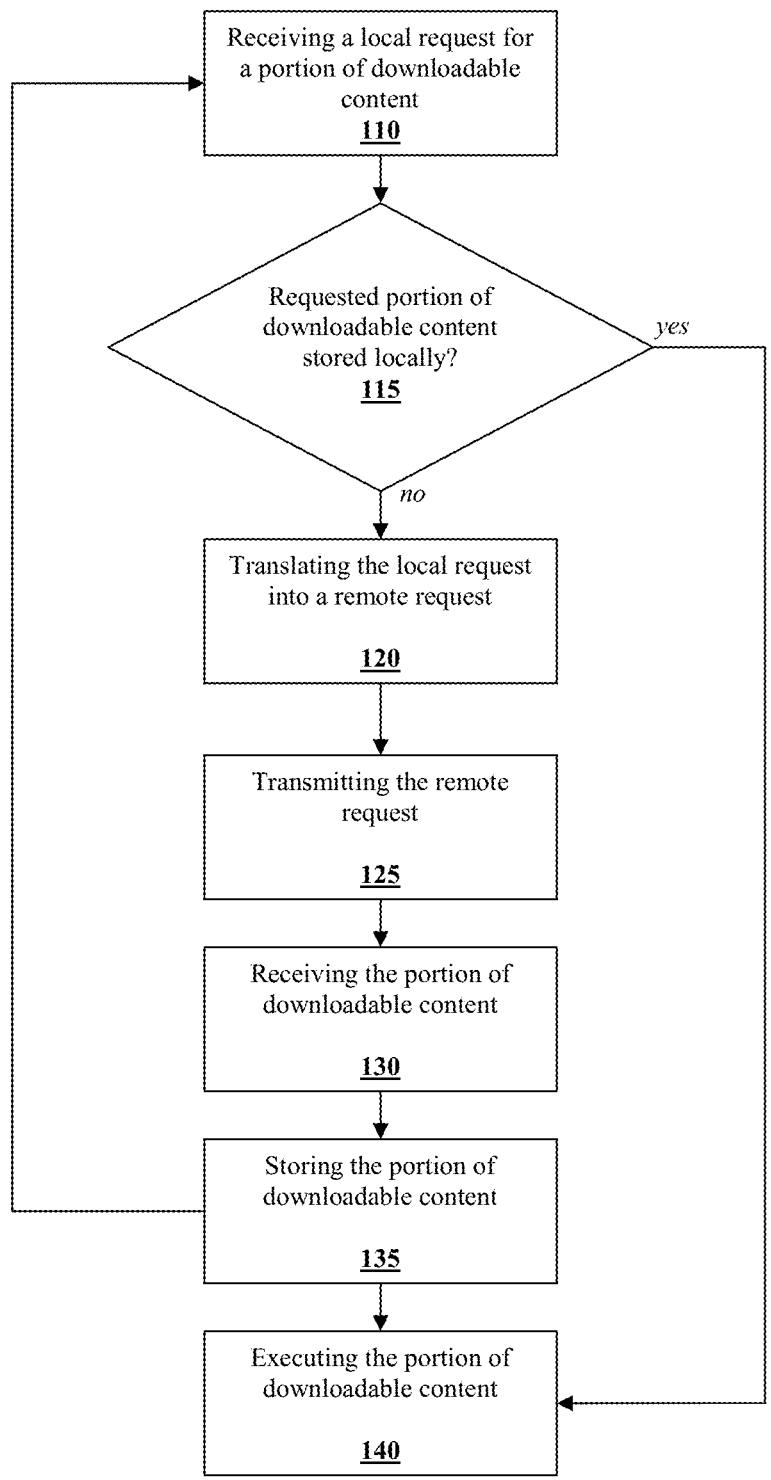
FIG. 1 is a flowchart illustrating a method for optimizing transfers of downloadable content according to an embodiment of the invention.

Referring now to the drawings, wherein like reference numerals designate identical or corresponding parts throughout the several views, FIG. 1 is a flowchart illustrating a method for optimizing transfers of downloadable content according to an embodiment of the invention. In this embodiment, content begins executing before its download is complete, and subsequent portions of the content are requested "on demand", as they are needed. Thus, a user does not have to wait for the entire, potentially large content to be downloaded before commencing execution, and can start enjoying the content as soon as possible. Further, the storage of potentially irrelevant data is eliminated.

At processing block 110, a local request for a portion of downloadable content is received. The local request can come in the form of a standard file operation with respect to a set of data associated with the desired portion of downloadable content, and can be transmitted from an application to the operating system, for example, as discussed further herein. The downloadable content can be, for example, video content, audio content, game content, and/or static visual content, including games, movies, software, TV shows, news, music videos, talk shows, trailers, advertisements, music, books, audio books, magazines, newspapers, catalogs, wall papers, themes, "add-on" content, or any other type of content divisible into smaller portions of executable content. It is contemplated that such content can be user- or developer-generated, free or paid, full or trial, and/or for sale or for rent. In addition, the term "portion" used herein can correspond to any part of the downloadable content that is divisible into any related or arbitrary groups of single or multiple bits or bytes of data. For example, "portions" of content may correspond to levels, chapters, scenes, acts, characters, backgrounds, textures, actions, songs, themes, durations, sizes, files, parts thereof, and combinations thereof. In another embodiment, however, "portions" of content may refer to data grouped together for the purpose of efficiency of transmission that have no other readily apparent commonalities.

At decision block 115, it is determined whether the requested portion of the downloadable content is stored locally. For example, a processor can query local memory for the requested portion of the downloadable content. If the requested portion of the downloadable content is indeed stored locally, it is executed at processing block 140. If the requested portion of the downloadable content is not stored locally, the local request is translated, such as by a processor, into a remote request at processing block 120. At processing block 125, the remote request is transmitted. For example, the remote request can be transmitted from a processor of a local device to a server. The server can then perform the processing described further herein with respect to FIG. 5, for example.

Turning back to FIG. 1, the requested portion of the downloadable content is received at processing block 130. At processing block 130, the requested portion of the downloadable content is stored locally. Local storage of the requested portions of downloadable content ensures that those portions of downloadable content will not have to be re-downloaded in the event that they are requested again. A portion of content may be requested multiple times, for example, if the same background or character in a game is used across multiple levels.

At processing block 140, the requested portion of the downloadable content is executed. Meanwhile, the method can repeat at processing block 110 for another received local request for a portion of downloadable content, while the previously requested portion of the downloadable content is being executed. In other words, the acts of the method can be performed asynchronously, i.e., permitting other processing to continue before the previous processing is complete.

As illustrated in FIG. 1, another local request for a portion of downloadable content can be received after storing the first portion of downloadable content at processing block 135. Although illustrated as occurring at this position, however, subsequent local requests for portions of downloadable content can occur at any point in the process after receiving the initial local request. If, however, the subsequently requested portion is not available for execution upon completed execution of the immediately preceding requested portion, an error message is generated and a delay is implemented to allow the subsequently requested portion to finish downloading, as described in further detail herein with respect to FIG. 3. As used herein, the term "subsequent" refers only to the order that requests are received, transmitted and/or predicted, and does not necessarily reflect that a particular portion of content is "after" a previously requested portion of content with respect to time, execution order, location in code, etc. Further, it is contemplated that the same portion of content can be requested multiple times, and thus, constitute more than one of a previously, currently and/or subsequently requested portion of content.

The method can continue until the connection between the requesting device and the host of the downloadable content is terminated; until the downloadable content has been executed in full; or until all portions of the downloadable content have been stored. For example, portions of a game can continue to be requested and executed until the user quits the game, turns off the game console, or finishes all levels of the game, or until the game has been downloaded in full. Thus, in the case that a user plays a game for only a short amount of time and decides that he or she does not like the game, only a small amount of the game has been downloaded to the game console. This minimizes the time lost by the user in waiting for the disliked game to download, the amount of bandwidth and/or data allowances lost on the disliked game, and the amount of memory occupied by the disliked game on the game console.

Similarly, when all levels of a game have been completed and the user no longer wishes to play the game, only the portions of the game needed by the user during gameplay have been downloaded to the game console. This minimizes the time lost by the user in waiting for unnecessary files or features to download, the amount of bandwidth and/or data allowances lost on downloading unnecessary files or features, and the amount of memory occupied by unnecessary files or features.

Figure 2:
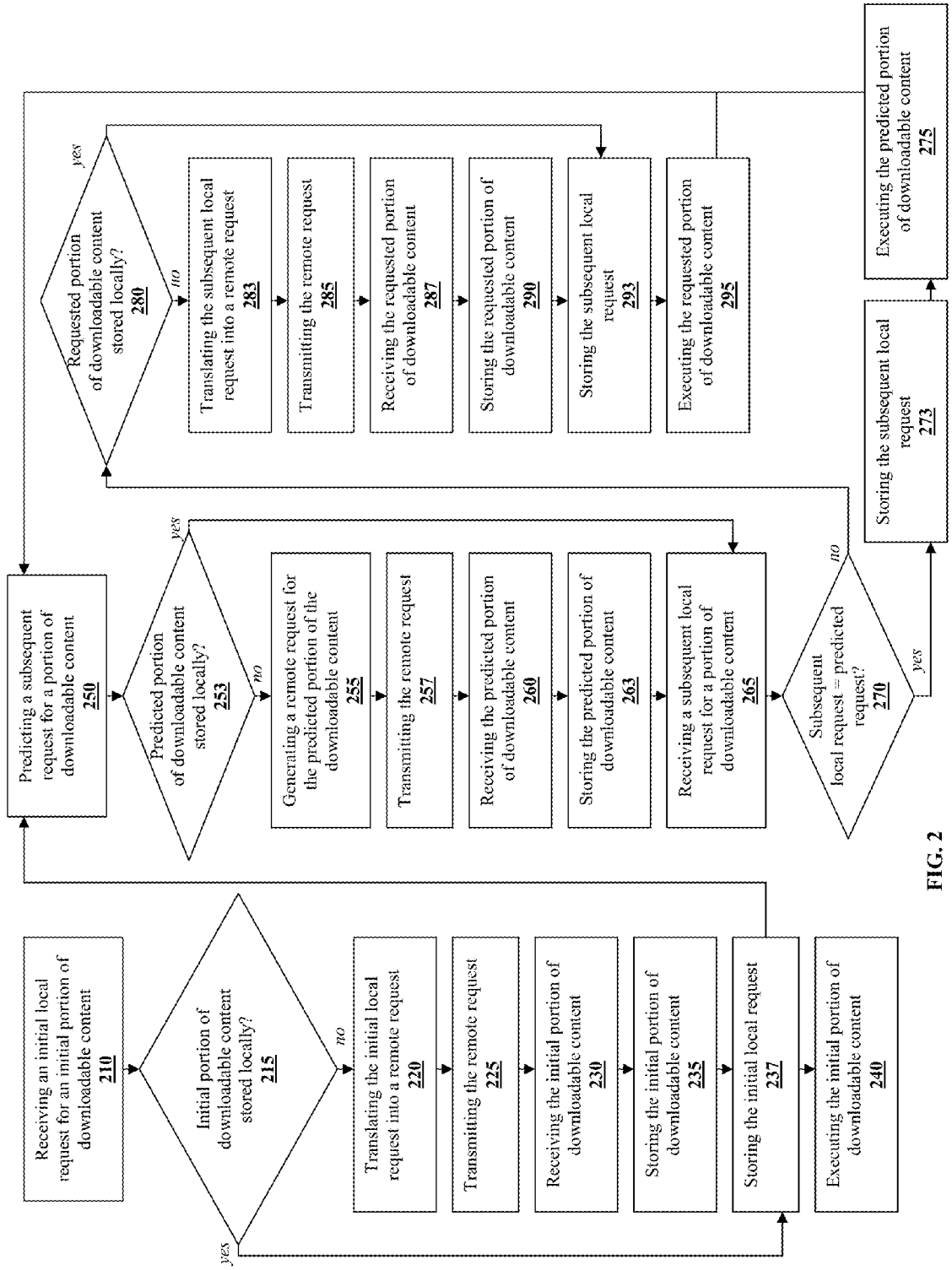
FIG. 2 is a flowchart illustrating a method for optimizing transfers of downloadable content according to another embodiment of the invention.

FIG. 2 is a flowchart illustrating a method for optimizing transfers of downloadable content according to another embodiment of the invention. According to this embodiment, portions of the downloadable content are requested "on demand" as they are needed for execution, based on a prediction of which portions will be needed for execution, or both. Requests for portions of downloadable content are predicted locally, and predicted portions of downloadable content are obtained prior to (or entirely without) receipt of a local request for those portions.

At processing block 210, an initial local request for an initial portion of downloadable content is received. At decision block 215, it is determined whether the initial portion of downloadable content is stored locally. If the initial portion of downloadable content is indeed stored locally, the initial local request is stored at processing block 237, and the initial portion of the downloadable content is executed at processing block 240. If the initial portion of downloadable content is not stored locally, however, the initial local request is translated to a remote request for the initial portion of downloadable content at processing block 220. At processing block 225, the remote request is transmitted, and at processing block 230, the initial portion of the downloadable content is received. At processing block 235, the initial portion of the downloadable content is stored, and at processing block 237, the initial local request is stored. The initial portion of the downloadable content is executed at processing block 240.

The word "initial" as used indicates a portion of content corresponding to a first request in a particular run of content, and does not necessarily indicate that the portion is a first portion of content with respect to time, execution order, location in code, etc. Thus, for example, the "initial" portion of a game can be level 7, the "initial" portion of a video can be midway through a video, the "initial" portion of a book can be chapter 8, etc. In another embodiment, however, the "initial" portion of content can correspond to a minimum working set of data for the downloadable content, or can indeed correspond to the portion of the downloadable content that is intended to be executed first with respect to the entire content. With respect to the latter, the initial portion could be, for example, level 1 of a game, the first 10 seconds of video, chapter 1 of a book, etc. In either case, at least an initial portion of downloadable content can be required to be locally stored prior to commencing execution of the downloadable content according to an embodiment. By requiring that an initial portion of content be downloaded before beginning execution, the user experience can be improved by minimizing delays or breaks in execution. Thus, for example, a user starting a game for a first time can be required to download level 1 of the game before playing, or a user returning to a game after leaving off at level 4 can be required to download level 5 of a game before playing.

As shown in FIG. 2, a subsequent request for a portion of downloadable content can be predicted at processing block 250. In this embodiment, the subsequent request is predicted locally, such as by the device executing the downloadable content. Such predictions can be made using, for example, prior requested portions of the downloadable content (e.g., the initial portion of the downloadable content), the prior local requests (e.g., the stored initial local request), downloadable content metadata (e.g., title, size, type, publisher), requesting device metadata (e.g., type, operating system, storage space, type of connection), user metadata for both the current user and other users (e.g., demographic information, content access history), and downloadable content request metadata (e.g., a consecutive log of local requests made). Optionally, the predicted request can be stored as predicted request metadata.

Downloadable content request metadata is not limited to the log of requests made in the particular content being executed, and can include logs of requests made in other previously executed content as well. For example, a subsequent request by a particular action game can be predicted using the request metadata of another action game, based on the assumption that action games execute similar functions in a similar order. Such assumptions can be made not only based on the genre of the requested content, but also its platform, publisher, author, release date, or any other available content metadata.

At decision block 215, it is determined whether the predicted portion of downloadable content is stored locally. If the predicted portion of the downloadable content is indeed stored locally, the method continues at processing block 265, as described further herein. If the predicted portion of the downloadable content is not stored locally, however, a remote request for the predicted portion of the downloadable content is generated at processing block 255. At processing block 257, the remote request is transmitted, and at processing block 260, the predicted portion of the downloadable content is received. At processing block 263, the predicted portion of the downloadable content is stored, and the method continues at processing block 265. Local storage of the predicted portions of downloadable content ensures that those portions will not have to be re-downloaded in the event that they are requested (e.g., if the prediction is correct) or again predicted. Blocks 250 to 263 can be completed independently of the application or module formulating the local requests.

At processing block 265, a subsequent local request for a portion of downloadable content is received. At decision block 270, it is determined whether the subsequent local request matches the predicted request, i.e., if the requests are for the same portion of the downloadable content, such as by accessing the predicted request metadata. The predicted request metadata can be updated to reflect whether or not the prediction was accurate, and can be used to refine subsequent predictions.

If the subsequent local request matches the predicted request, then the subsequent local request is stored at processing block 273, and the predicted portion of the downloadable content is executed at processing block 275. If the subsequent local request does not match the predicted request, then it is determined whether the requested portion of downloadable content is stored locally at decision block 280. If the requested portion of downloadable content is indeed stored locally, then the subsequent local request is stored at processing block 293, and the requested portion of downloadable content is executed at processing block 295. If the requested portion of downloadable content is not stored locally, then the subsequent local request is translated into a remote request at processing block 283, and the remote request is transmitted at processing block 285. At processing block 287, the requested portion of downloadable content is received, and at processing block 290, it is stored. The subsequent local request is stored at processing block 293, and the requested portion of downloadable content is executed at processing block 295.

Blocks 250 to 295 can be repeated for any number of portions of downloadable content. Local requests stored at blocks 237, 273 and 293, for example, can be used to establish and expand the downloadable content request metadata in order to make subsequent predictions (both for the requested content and for future requested content) more accurate. The method can continue until the connection between the requesting device and the host of the downloadable content is terminated; until the downloadable content has been executed in full; or until all portions of the downloadable content have been stored.

Although illustrated as reoccurring only after receipt of a subsequent local request and execution of the requested portion of content, it is contemplated that subsequent requests can be predicted, and the predicted portions of content downloaded, before the local request associated with a previous prediction is received. For example, after receiving a first local request at 210 and executing a first portion of content at 240, a first prediction can be made of what the second local request will be for at 250, and the predicted portion of the content can be downloaded and stored at 260 and 263, respectively. While the first portion of content is being executed at 240, and before a second local request is received at 265, a second prediction can be made of what the third local request will be for, and the predicted portion of content can be downloaded and stored.

The predictions and associated downloads can continue perpetually while the method is being executed, or can pause or stop at any point within the method. For example, the predictions can pause when the next local request is received, at which point past or future predictions can be refined. In addition, the predictions can pause when a certain number of predicted requests have been made (or a certain amount of predicted portions of content have been downloaded), beyond the currently executing request or portion of content. For example, if level 1 of a game is being currently executed pursuant to a first local request and subsequent local requests have not yet been received, predictions can be limited to the next two requests. Thus, second and third requests for level 2 and 3, respectively, can be predicted, and their respective portions of the game downloaded. However, a fourth request could not be predicted until the real second local request is received. Because the downloadable content request metadata can be updated upon receipt of the second local request, such an embodiment allows future predictions to be refined to be more accurate, and only a limited amount of predicted portion of content will have been downloaded in the meantime. Further, the amount of memory dedicated to predicted portions of content (that may or may not be actually needed for execution) is limited. Thus, if a user turns off the game before the second local request is received and never again plays the game, only a limited amount of memory has been occupied by unnecessary data.

Upon receipt of the second local request at processing block 265, the method can proceed to decision block 270 with respect to the first prediction. In other words, the second local request can be compared to the first prediction at 270, and the method can proceed as illustrated. Further, upon storage of the second local request at processing block 273 or 293, the downloadable content request metadata can be updated, and subsequent predictions can be refined. For example, the second prediction (and any other predictions made prior to receipt of the second local request) can be redefined based on the content of the second local request and the updated request metadata, and new predictions can continue to be established.

Figure 3:
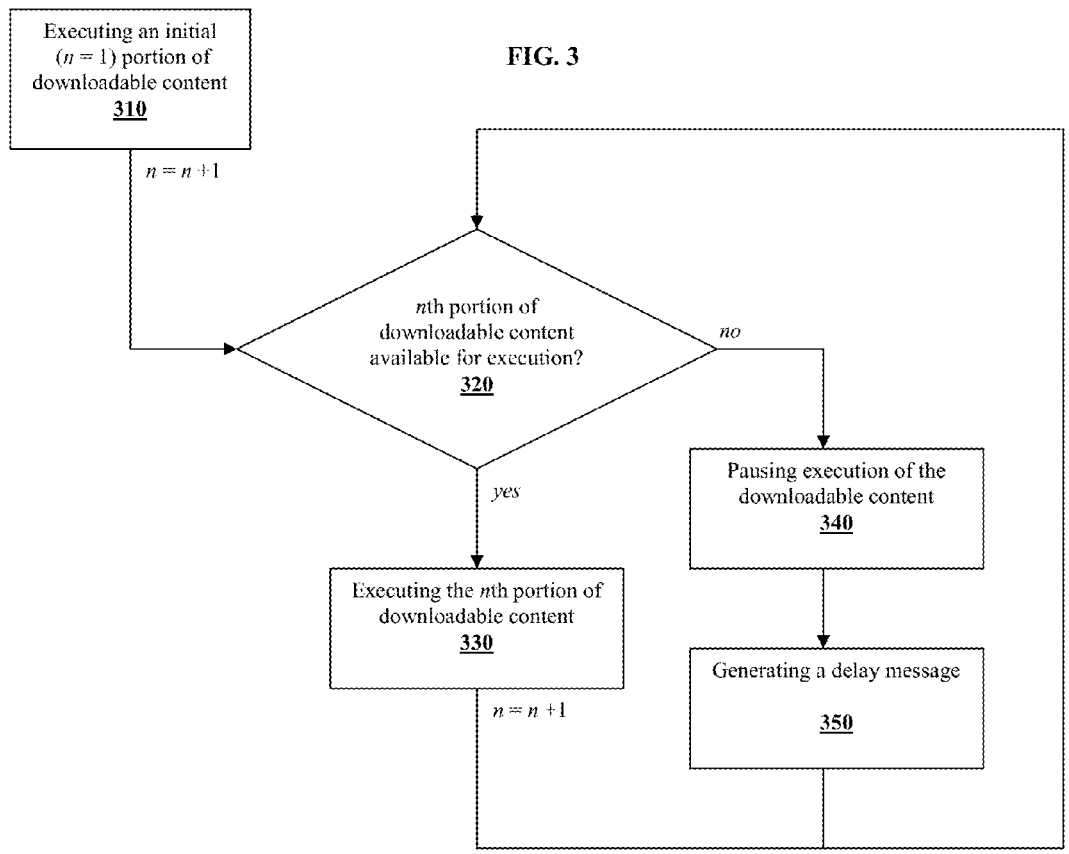
FIG. 3 is a flowchart illustrating a method for executing downloadable content according to an embodiment of the invention.

FIG. 3 is a flowchart illustrating a method for executing downloadable content received as described by FIG. 1 or 2, for example. Execution of the content may include, for example, outputting the content, such as by displaying the content, which may be affected by one or more user inputs. According to the embodiment shown in FIG. 3, a first portion of downloadable content is executed, and, upon completed execution of the first portion, a second portion is executed, and so on and so forth. If, however, the subsequently requested portion is not available for execution upon completed execution of the immediately preceding requested portion, an error message is generated and a delay is implemented to allow the subsequently requested portion to finish downloading. At processing block 310 of FIG. 3, an initial portion of downloadable content is executed. For purposes of explanation only, this portion of downloadable content is assigned a value of n=1. Upon commencing execution of the initial portion of downloadable content, n is set as n=n+1, or n=2. As used herein, the various values of n refer only to the order in which particular portions of content are requested, transmitted and/or predicted, and do not necessarily reflect that a particular portion of content is "after" a previously requested portion of content with respect to time, execution order, location in code, etc. Further, it is contemplated that more than one value of n can refer to the same portion of downloadable content, for example, in the case of a portion of downloadable content that is requested more than once.

At decision block 320, it is determined whether the nth portion of downloadable content is available for execution. This determination can be made at any point after execution of the previous portion (i.e., the n−1 portion) of the content. For example, the availability of the second portion can be queried immediately upon execution of the initial portion of the content; at particular intervals during execution of the initial portion; at random times during execution of the initial portion; or just prior to completing execution of the initial portion. A portion of downloadable content is available for execution when at least a minimum amount of its data is stored to support execution. For example, the portion could be available for execution if it is fully downloaded and stored, or if there is at least a minimum working amount of portion data to begin its execution.

If the nth portion of downloadable content is available for execution, then it is executed at processing block 330, and n is set as n=n+1, and the method returns to decision block 320. For example, if the second portion of downloadable content is available for execution, then it is executed at processing block 330, and n is set as n=n+1, or n=3. It would then be determined whether the third portion of downloadable content is available for execution at decision block 320, and so on and so forth for each nth portion of downloadable content.

If the nth portion of downloadable content is not available for execution, then execution of the downloadable content is paused at processing block 340, and a delay message is generated at processing block 350. This prevents abnormal timeouts and other abnormal situations from occurring. Further, the value of n remains unchanged. Thus, the method continues to determine whether the nth portion of downloadable content is available for execution at decision block 320. When the nth portion of downloadable content is available for execution, it is executed at processing block 330, and n is set as n=n+1. The method returns to decision block 320 and can repeat for each nth portion of downloadable content, until the connection between the requesting device and the host of the downloadable content is terminated, or until the downloadable content has been executed in full.

Execution of any portion of the downloadable content can be paused at any time to allow downloading of the nth portion to progress or complete. In this embodiment, however, execution of the downloadable content is paused if the nth portion of downloadable content is not available for execution upon completed execution of the previous portion (i.e., the n−1 portion) of the content. For example, if the second portion of downloadable content is not available for execution, then overall execution of the downloadable content is paused at processing block 340 (i.e., a delay is implemented between completed execution of the initial portion and commenced execution of the second portion), and a delay message is generated at processing block 350. The value of n remains as n=2. Thus, the method continues to return to decision block 320 to determine whether the second portion of downloadable content is available for execution. When the second portion of downloadable content becomes available for execution, it is executed at processing block 330, and n is set as n=n+1, or n=3 in this example. It is then determined whether the third portion of downloadable content is available for execution at decision block 320, and so on and so forth. The method repeats for each locally requested portion of downloadable content, or until the connection between the requesting device and the host of the downloadable content is terminated.

Figure 4:
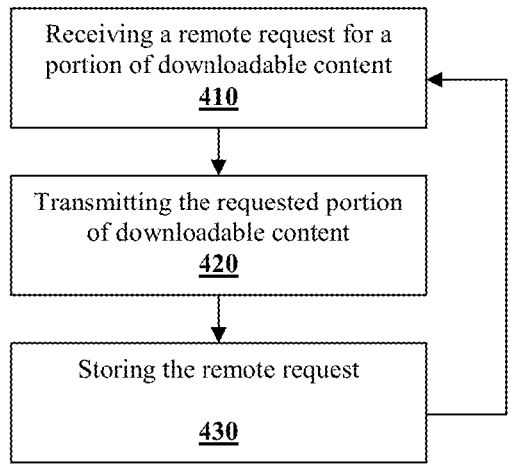
FIG. 4 is a flowchart illustrating a method for building downloadable content request metadata according to an embodiment of the invention.

FIG. 4 is a flowchart illustrating a method for establishing and expanding downloadable content request metadata according to an embodiment of the invention. In this embodiment, the downloadable content request metadata is built remotely, such as by a server or third party hosting the downloadable content. At processing block 410, a remote request for a portion of downloadable content is received. At processing block 420, the requested portion of downloadable content is transmitted. At processing block 430, the remote request is stored in a downloadable content request metadata file. The method repeats for each received remote request for a portion of downloadable content, with the remote requests being stored sequentially according to their order of receipt. The downloadable content request metadata can be stored in association with a variety of other information, such as downloadable content metadata (e.g., title, size, type, publisher), requesting device metadata (e.g., type, operating system, storage space, type of connection) and user metadata for both the current user and other users (e.g., demographic information, content access history).

If not already stored, the downloadable content metadata, requesting device metadata, user metadata and/or downloadable content request metadata can be requested, obtained and expanded with information from a variety of sources, including the requesting device; publisher, manufacturer and/or distributor databases; third-party websites; and/or third-party user devices. The method can continue until the connection between the requesting device and the host of the downloadable content is terminated, or until all portions of downloadable content have been requested and/or transmitted.

Figure 5:
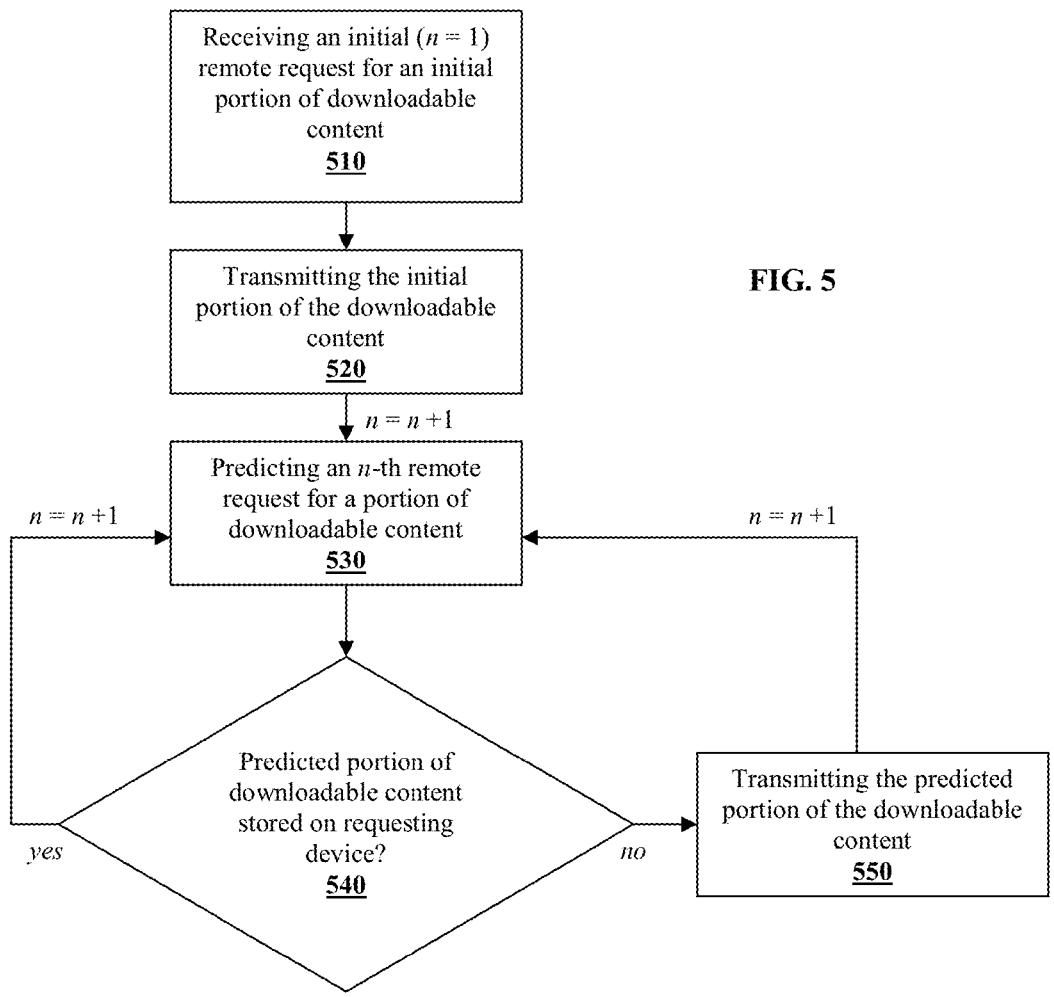
FIG. 5 is a flowchart illustrating a method for optimizing transfers of downloadable content according to a further embodiment of the invention.

FIG. 5 is a flowchart illustrating a method for optimizing transfers of downloadable content using predictions according to an embodiment of the invention. In this embodiment, the method is illustrated with respect to a server hosting the downloadable content. It is contemplated, however, that the remote predictions described with respect to FIG. 5 can be combined with, alternated with, or made simultaneously or concurrently with, the local predictions described with respect to FIG. 2, in a synchronous or asynchronous fashion. Further, it is contemplated that the embodiment of FIG. 5 can be combined with, alternated with, or performed simultaneously or concurrently with, the embodiment described with respect to FIG. 4, in a synchronous or asynchronous fashion. When performed asynchronously, the methods illustrated by FIGS. 4 and 5 can receive and fulfill requests, as well as build up downloadable content request metadata, while predicting future requests.

At processing block 510 of FIG. 5, an initial remote request for an initial portion of downloadable content is received. For purposes of explanation, this portion of downloadable content is assigned a value of n=1. At processing block 520, the initial portion of the downloadable content responsive to the initial remote request is transmitted. Upon commencing transmission of the initial portion of downloadable content, n is set as n=n+1, or n=2. At processing block 530, an nth remote request for a portion of downloadable content is predicted. Such predictions can be made using, for example, the prior requested portions of the downloadable content (e.g., the initial portion of the downloadable content), the prior remote requests (e.g., the remote requests stored at 430 of FIG. 4), downloadable content metadata (e.g., title, size, type, publisher), requesting device metadata (e.g., type, operating system, storage space, type of connection), user metadata for both the current user and other users (e.g., demographic information, content access history), downloadable content request metadata (e.g., as established and built up as shown in FIG. 4), and predicted request metadata.

To formulate predictions, this data can be analyzed with respect to the requesting user, the requesting device and/or the particular requested downloadable content. Alternatively or additionally, this data can be aggregated and analyzed across multiple requesting users, requesting devices and/or requested downloadable content. In the latter embodiment, downloadable content request metadata from multiple runs of the same downloadable content can be analyzed to identify optional branches within execution of the downloadable content, and the various analyses can be merged into a branching downloadable content request metadata file.

For example, the downloadable content request metadata file can have branches that predict that if geometric model data is requested, the associated textures will also be requested. Thus, if a local request is received for level 1 geometric model data, it can be predicted that level 1 textures will be requested. Similarly, if a local request is received for level 2 geometric model data, it can be predicted that level 2 textures will be requested, and so on and so forth.

In another example, a subsequent request by user device A in game X can be predicted by analyzing established file access patterns within multiple request metadata files associated with multiple user devices in game X. Such a prediction is based on the assumption that multiple user devices executing game X request game X data in a similar order (i.e., that users of the same game take similar actions in a similar order). In another example, a subsequent request by user device B in puzzle game Y can be predicted by analyzing an established file access pattern of user device C within puzzle game Y, where user device B and user device C are observed to have similar gameplay behavior (i.e., similar file access patterns) in similar puzzle game Z. This prediction is based on the assumption that because user device B and user device C request game Z data in a similar order, they will also request similar game Y data in a similar order (i.e., that two users having similar gameplay behavior in one puzzle game will also have similar gameplay behavior in a similar puzzle game).

Because the requests, metadata and predictions can be dynamic, the methods described herein are suitable for use with downloadable content that does not execute the same or similar operations in the same or similar order across every run, such as interactive content that executes in accordance with user inputs. Thus, for example, the systems and methods described herein can be implemented in concert with high-level, advanced video games and virtual reality environments.

At optional decision block 540, it is determined whether the predicted portion of downloadable content is already stored on the requesting device. This determination can be made by analyzing the downloadable content request metadata associated with the particular requested downloadable content and the particular requesting device to determine whether the predicted portion has been previously requested and transmitted. Alternatively, a query can be transmitted to the requesting device to check local memory for the predicted portion, and a response can be received. If the predicted portion of downloadable content is already stored on the requesting device, then n is set as n=n+1, and another prediction is made at processing block 530. If the predicted portion of downloadable content is not already stored on the requesting device, then it is transmitted at processing block 550; n is set as n=n+1; and another prediction is made at processing block 530. The method can continue, for example, until either of the requesting device or the server terminates the connection, or until all of the portions of the downloadable content have been transmitted.

In an embodiment in which optional decision block 540 is omitted, the method proceeds directly from processing block 530, where an nth remote request for a portion of downloadable content is predicted, to processing block 550, where the predicted portion of the downloadable content is transmitted, or "pushed", to the requesting device. The requesting device can then take any action desired with respect to the predicted portion of content. For example, if the predicted portion is already stored on the requesting device, then the requesting device can request that its transmission be terminated, or alternatively, overwrite the previously stored portion. If the predicted portion is not already stored on the requesting device, then the requesting device can simply store the predicted portion and await a local request for that portion of content.

Figure 6:
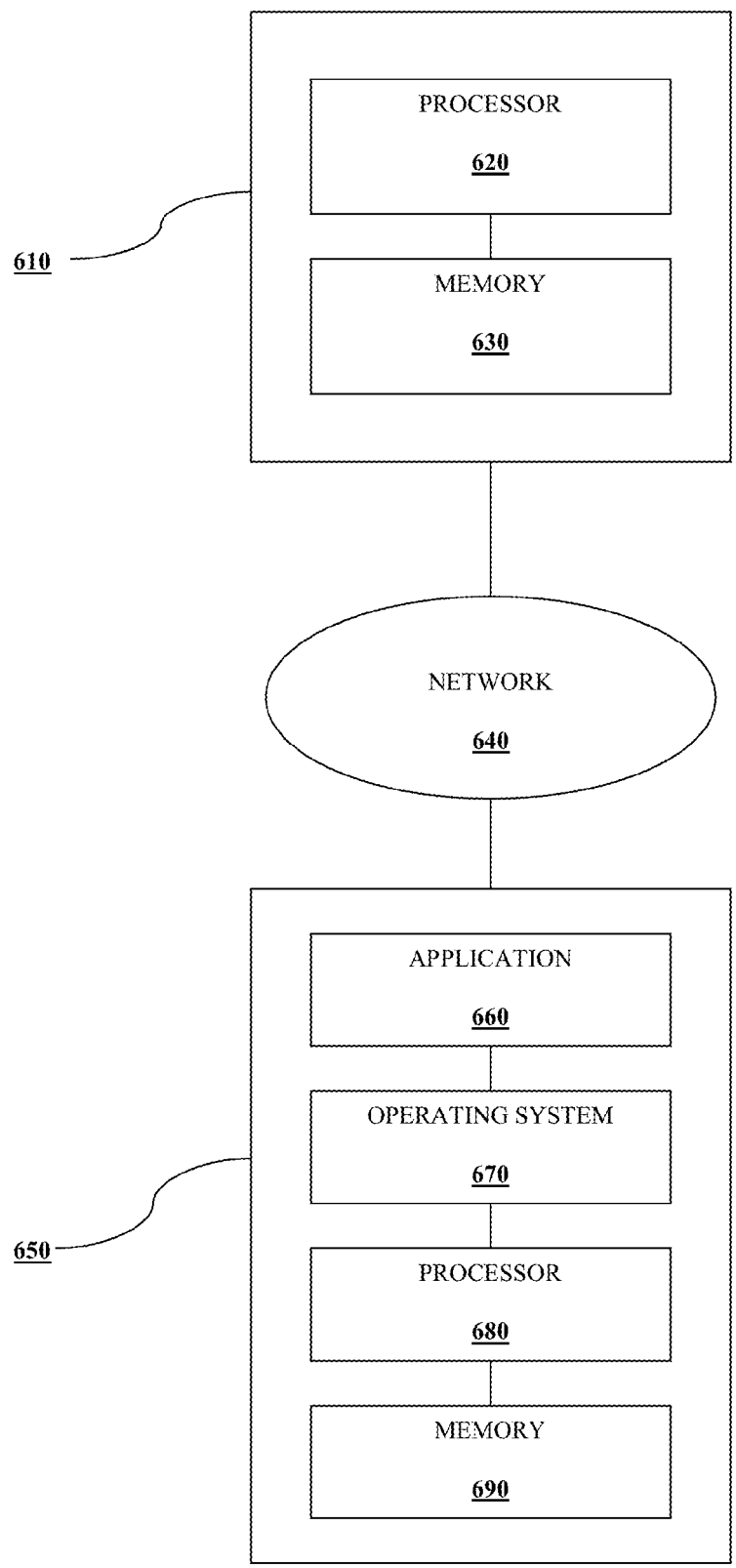
FIG. 6 is a schematic diagram illustrating a system of an embodiment for effecting the methods described herein.

FIG. 6 illustrates a system for effecting the acts of one or more of the methodologies described herein. Server 610 is connected over network 640 to a user device 650. Server 610 includes processor 620 and memory 630, which are in communication with one another. Server 610 is typically a computer system, and may be an HTTP (Hypertext Transfer Protocol) server, such as an Apache server. It is contemplated, however, that server 610 can be a single or multiple modules or devices hosting downloadable content or portions thereof. Further, server 610 can be a dedicated server, a shared server, or combinations thereof. For example, server 610 can be a server associated with the developer, publisher or distributor of the downloadable content or portions thereof, or a third-party server, such as a peer device in a peer-to-peer (P2P) network. In addition, server 610 can comprise a virtual market or online shopping-based service offering the downloadable content. In this embodiment, server 610 (alone or in combination with other devices) can process and perform various commercial transactions, such as billing, in addition to those acts described herein.

User device 650 includes application 660, operating system 670, processor 680, and memory 690, which are in communication with one another. User device 650 may be a mainframe, minicomputer, personal computer, laptop, personal digital assistant (PDA), cell phone, television, CD player, DVD player, BD player, game console, tablet, e-reader, and the like. Server 610 and user device 650 are characterized in that they are capable of being connected to network 640. Network 640 can be wired or wireless, and can include a local area network (LAN), wide area network (WAN), a telephone network (such as the Public Switched Telephone Network (PSTN)), a radio network, a cellular or mobile phone network (such as GSM, GPRS, CDMA, EV-CO, EDGE, 3GSM, DECT, IS-136/TDA, iDEN, and the like), intranet, the Internet, or combinations thereof. Memory 630 and memory 690 may be any type of storage media that may be volatile or non-volatile memory that includes, for example, read-only memory (ROM), random access memory (RAM), magnetic disk storage media, optical storage media, flash memory devices, zip drives, and combinations thereof. Memory 630 and memory 690 can be capable of permanent or temporary storage, or both; and can be internal, external, or both.

In an embodiment in which a peer-to-peer network is used, server 610 may be a third party user device from which user device 650 fetches requested or predicted portions of the downloadable content. When such a peer-to-peer network is used, bandwidth use and associated costs are reduced from other servers hosting the content, such as publishers' servers. For example, all requested and predicted portions of the content can be obtained by user device 650 from third party user devices, altogether eliminating bandwidth usage by user device 650 from other servers. In another example, a third party user device can be used in conjunction with an application publisher's server to provide the content, reducing bandwidth usage by user device 650 from other servers. Further, user device 650 can cooperate with any number of third party user devices to each request different portions of the downloadable content from a server 610, then share them amongst themselves as needed. In this embodiment, user device 650 and the third party user devices both act as hosts, running both server and client programs to provide requested portions of content to each other.

In use, application 660 makes calls to operating system 670 to load and access data stored in memory 690, using standard file operations. Application 660 can be any software and/or hardware that provides an interface between a user of user device 650 and the downloadable content. The standard file operations include, for example, "open" (i.e., specifying which file is to be accessed), "seek" (i.e., specifying what position to go to in the file to read data), "read" (i.e., requesting that data be read from the file and copied to application 660), and "close" (i.e., requesting that the file be closed for now). By patching existing code or replacing drivers, operating system 670 translates the standard file operations into new versions that perform the additional operations described herein, in order to optimally download data "on demand". Thus, application 660 can begin execution of the downloadable content before it has been downloaded in its entirety. Further, by replacing the standard file operations with new operations, the methodologies described herein can be implemented with a wide variety of new and existing applications. For example, the disclosed embodiments can be implemented with older or emulated games, because the game code need not be heavily modified (or modified at all) to allow for streaming of the game content.

In one embodiment, every file within application 660 is mapped to a unique location in a created address space. For example, if application 660 has two files: (1) FILE1.DAT, of 10 kB, and (2) FILE2.DAT, of 20 kB, their data can be remapped to unique locations, such as, for example, 0-9,999, and 10,000-29,999, respectively. In this example, application 660 communicates the following local request to operating system 670: (A) an "open" request for FILE 2.DAT, (B) a "seek" request to go to location 20, and (C) a "read" request for 40 bytes.

In one embodiment, operating system 670 directs processor 680 to determine whether the requested portion of content is stored in memory 690 using the local request as received from application 660. If the requested portion of content is stored in memory 690, it is read and copied to application 660. If the requested portion of content is not stored in memory 690, operating system 670 translates the local request from application 660 into a remote request for the desired portion of content in a format readable to server 610. In this example, operating system 670 translates the local request for data from FILE2.DAT at location 20 for 40 bytes, into a remote request for the portion of downloadable content corresponding to locations 10,020 to 10,039, and user device 650 transmits the remote request to server 610. Processor 620 of server 610 retrieves the requested portion of downloadable content from memory 630, and returns it to user device 650. User device 650 stores the requested portion of downloadable content in memory 690, and copies it to application 660 as a response to its local request. The requested portion of downloadable content is then available to be executed by application 660.

In another embodiment in which the format of the local request is not consistent with the format used by processor 680 and/or memory 690, operating system 670 immediately translates the local request from application 660 into a request for the desired portion of content in a format readable to processor 680 and/or memory 690. Thus, in the above embodiment, operating system 670 translates the local request for data from FILE2.DAT at location 20 for 40 bytes, into a local request for the portion of content corresponding to locations 10,020 to 10,039, then directs processor 680 to determine whether the requested portion of content is stored in memory 690 using the local request as received from application 660. If the requested portion of content is stored in memory 690, it is read and copied to application 660. If the requested portion of content is not stored in memory 690, operating system 670 translates the local request for the portion of content corresponding to locations 10,020 to 10,039, into a remote request for the portion of content corresponding to locations 10,020 to 10,039, and user device 650 transmits the remote request to server 610. Processor 620 of server 610 retrieves the requested portion of downloadable content from memory 630, and returns it to user device 650. User device 650 stores the requested portion of downloadable content in memory 690, and copies it to application 660 as a response to its local request. The requested portion of downloadable content is then available to be executed by application 660.

Turning now to implementation of the particular methodologies described herein, and specifically with respect to FIG. 1, a user of user device 650 selects downloadable content available on server 610 using application 660. In one embodiment, the original code of application 660 has been modified to request only an initial portion of downloadable content (e.g., its minimum working files) in response to a user request for the entire downloadable content. In this embodiment, application 660 transmits a local request corresponding to the initial portion of the selected content to operating system 670. Operating system 670 communicates the request to processor 680, which queries memory 690 for the initial portion of the content.

In another embodiment in which the original code of application 660 has not been modified in this manner, application 660 requests the entire downloadable content in response to a user request for the entire downloadable content (i.e., all portions of the downloadable content). In this embodiment, application 660 transmits a local request corresponding to the entire downloadable content to operating system 670. Operating system 670 translates the request for the entire downloadable content into a request for only an initial portion of downloadable content (e.g., its minimum working files), and communicates this request to processor 680.

In either of these embodiments, if the initial portion of the selected content is in memory 690, then it is executed by application 660 in conjunction with operating system 670 and processor 680. If the initial portion of the selected content is not in memory 690, then operating system 670 translates the local request into a remote request for the initial portion of content, and transmits it to server 610 over network 640. For example, a signal is transmitted from user device 650, the signal having a destination address (e.g., an address representing server 610), a request (e.g., a request for the initial portion of content), and a return address (e.g., an address representing user device 650, which initiated the remote request). Processor 620 queries memory 630 for the initial portion of content, and transmits it to user device 650. User device 650 stores the initial portion of content in memory 690, and it is executed by application 660 in conjunction with operating system 670 and processor 680. Subsequent local requests for portions of downloadable content generated by application 660 are similarly handled.

In still another embodiment where neither the original code of application 660 nor operating system 670 is modified to request only an initial portion of downloadable content in response to a user request for the entire downloadable content, application 660 and operating system 670 request the entire downloadable content locally and remotely, respectively, and server 610 translates the request. Specifically, application 660 transmits a local request corresponding to the entire downloadable content to operating system 670. Operating system 670 communicates the request to processor 680, which queries memory 690 for the entire downloadable content. If the entire downloadable content is in memory 690, then it is executed by application 660 in conjunction with operating system 670 and processor 680. If the entire content is not in memory 690, then operating system 670 translates the local request into a remote request for the entire content, and transmits it to server 610 over network 640. Server 610 translates the request for the entire content into a request for an initial portion of content (e.g., its minimum working files), and transmits the initial portion of content to user device 650. User device 650 stores the initial portion of content in memory 690, and it is executed by application 660 in conjunction with operating system 670 and processor 680 Subsequent local requests for portions of downloadable content generated by application 660 are translated locally by operating system 670 according to the previously described embodiments.

In implementing the method of FIG. 1, subsequent requests can be received, and their associated portions of downloadable content fetched, while a previously requested portion of the downloadable content is being executed. In other words, the acts of the methods described herein can be performed asynchronously, i.e., permitting other processing to continue before previous processing is complete. This allows a user to begin playing a game, for example, before the download of the entire game is complete.

In implementing the method shown in FIG. 2, for example, server 610, network 640 and user device 650 perform similar functions as described above with respect to implementation of FIG. 1. In addition, local requests received from application 660 are stored sequentially in the order that they are received as downloadable content request metadata in memory 690. Processor 680 accesses this downloadable content request metadata, and predicts subsequent requests for portions of downloadable content by analyzing file access patterns within the request metadata. Processor 680 can further make predictions using, for example, prior requested portions of the downloadable content (e.g., the initial portion of the downloadable content), the prior local requests (e.g., the stored initial local request), downloadable content metadata (e.g., title, size, type, publisher), requesting device metadata (e.g., type, operating system, storage space, type of connection), and user metadata for both the current user and other users (e.g., demographic information, content access history).

Processor 680 queries memory 690 to determine whether the predicted portion of content is stored locally. If the predicted portion of content is stored in memory 690, and processor 680 predicts another subsequent request for another portion of downloadable content, and so on and so forth. If the predicted portion of downloadable content is not stored in memory 690, then operating system 670 generates a remote request for the predicted portion of content, and transmits it to server 610 over network 640. Server 610 fulfills the remote request as described above with respect to implementation of FIG. 1, and it is stored locally in memory 690.

In one embodiment, the predicted request is stored in memory 690 as predicted request metadata. Thus, when a subsequent local request is actually received at operating system 670 from application 660, processor 680 requests the sequentially corresponding predicted request from memory 690, and compares the prediction to the subsequent local request. If the subsequent local request is for the same portion of downloadable content as the prediction, the predicted portion of content, stored within memory 690, is executed by application 660 in conjunction with operating system 670 and processor 680. If the subsequent local request for a different portion of downloadable content than the prediction, then processor 680 queries memory 690 to determine whether the requested portion of content is stored locally. In either case, the predicted request metadata can be updated to reflect whether or not the prediction was accurate, and can be used to refine future predictions. Implementation of FIG. 2 then continues as described above with respect to the implementation of FIG. 1.

In another embodiment, the predicted request need not be stored in memory 690. Thus, when a subsequent local request is actually received at operating system 670 from application 660, processor 680 simply queries memory 690 to determine whether the requested portion of content is stored locally. In other words, processor 680 is unconcerned with how the requested portion of content became available in memory 690. Implementation of FIG. 2 then continues as described above with respect to the implementation of FIG. 1.

In implementing the method shown in FIG. 3, application 660 executes an initial portion of downloadable content, in conjunction with operating system 670 and processor 680. Processor 680 queries memory 690 to determine whether the next portion of downloadable content is available for execution (i.e., whether at least a minimum working amount of data with respect to the next portion is stored in memory 690). If the next portion of content is available for execution, then it is provided to and executed by application 660 upon completing execution of the initial portion.

If the next portion of content is not available for execution upon completing execution of the initial portion, operating system 670 suspends execution of the downloadable content by application 660. In other words, a delay is introduced between execution of the initial and subsequent portion of content. Processor 680 retrieves a stored delay message from memory 690 that is executed until the next portion of content is available for execution and returned to application 660. Because the downloading of the portions of content is performed in a separate process from the execution of the downloadable content (and because execution of the downloadable content by application 660 is paused until the next portion of content responsive to its local request is available) abnormal time-outs and other abnormal situations are prevented from occurring. In other words, application 660 remains unaware that both the next portion of content is unavailable and that its processes were suspended until that portion of content became available. In order to minimize the amount of time that application 660 is suspended, predictions are formulated to request portions of the content likely to be requested by application 660 in the same order that they will be requested, as described further with respect to FIGS. 2 and 5.

In implementing the method illustrated in FIG. 4, thus establishing and maintaining downloadable content request metadata, server 610 receives a request for a portion of downloadable content from user device 650 over network 640. Processor 620 retrieves the requested portion of content from memory 630, and transmits it to user device 650 over network 640. Processor 620 sequentially stores the requests for portions of downloadable content in the order that they are received in memory 630. This sequential list of file requests makes up the downloadable content request metadata used by server 610 to predict subsequent requests for portions of content, as described further herein with respect to implementation of the method shown in FIG. 5.

It is contemplated that the various types of data used for prediction herein (e.g., downloadable content metadata, downloadable content request metadata, requesting device metadata, user metadata) can be shared between server 610 and user device 650 in order to refine the predictions of both server 610 and user device 650. For example, user device 650 can establish, maintain and share downloadable content request metadata separate with server 610 in order to provide a more accurate sequential listing of the requests made in a particular run of content. Thus, the downloadable content request metadata available to server 610 is not limited to those requests made remotely, and can further include requests made locally for portions of content available locally.

In implementing the method illustrated in FIG. 5, server 610 receives an initial request for a portion of content and transmits the portion of content to user device 650 as described above. In this embodiment, processor 620 accesses the downloadable content request metadata in memory 630, and predicts subsequent requests for portions of downloadable content, as described further above with respect to FIG. 5. Optionally, processor 620 determines whether the predicted portion of content is stored in user device 650. In one embodiment, processor 620 makes this determination by searching file request records within memory 630 for information indicating that the predicted portion of content was previously requested by, and/or transmitted to, user device 650. If the predicted portion of content was not previously requested by, and/or transmitted to, user device 650, the predicted portion of content is transmitted, or "pushed", from server 610 onto memory 690. If the predicted portion of content was indeed previously requested by, and/or transmitted to, user device 650, processor 620 predicts a subsequent request for a portion of downloadable content.

In another embodiment, processor 620 transmits a query to user device 650 over network 640 regarding whether the predicted portion of content is stored in memory 690. Processor 680 queries memory 690 to determine whether the predicted portion of content is stored locally. Processor 680 then transmits an affirmative or negative response to server 610 over network 640. If the predicted portion of content is not stored in user device 650, the predicted portion of content is transmitted, or "pushed", from server 610 onto memory 690. If the predicted portion of content is indeed stored in user device 650, processor 620 predicts a subsequent request for a portion of downloadable content.

In an embodiment in which processor 620 does not determine whether the predicted portion of content is stored in user device 650, server 610 proceeds to transmit, or "push", the predicted portion of content onto memory 690 of user device 650. Processor 680 of user device 650 can determine whether the pushed portion of content is already stored in memory 690, in which case it can submit a request to server 610 to terminate transmission of the portion. Alternatively, processor 680 can simply allow the pushed portion of content to overwrite the previously stored portion in memory 690. If the pushed portion of content is not already stored in memory 690, it can be stored therein to be responsive to a local request for that portion of content.

In any of the above described embodiments, server 610 and/or user device 650 can initiate deletion of portions of the downloadable content within memory 690. Thus, if memory 690 is full and further portions of the downloadable content are required to continue its execution, cache algorithms can be employed to decide which portions to discard in order to make room for the new portions. For example, if a user is on level 15 of 30 total levels in a 24 GB game, and the game console has only 12 GB of storage, the least recently accessed portions of the game (e.g., the portions corresponding to level 1) can be purged to free storage space for the requested or predicted portions of content needed to continue execution of the game (e.g., the portions associated with upcoming level 16).

Thus, by initiating cache algorithms in concert with the described embodiments, downloadable content having a size exceeding the storage space of user device 650 can not only be executed, but can be executed with minimal delay to the user. For example, content previously limited to distribution by physical media due to local storage limitations, excessive download times and large bandwidth usage (e.g., content conventionally distributed on Blu-ray discs), can be transmitted by server 610 and executed by user device 650 in accordance with the disclosed systems and methods.

The above described systems and methods are also useful in an embodiment in which user device 650 is a mobile device that requests the downloadable content from server 610 over a cellular network 640. Conventionally, such mobile devices have had limited access to downloadable content, due to the slow transmission rates of cellular networks, the high data transmission costs associated with cellular networks, and the very limited storage space available on mobile devices due to their desirably small size. By implementing the disclosed systems and methods in such circumstances, however, delays due to slow transmission rates are decreased, as the content can begin execution without all of its data, and only portions of the content are needed at particular times to continue execution. The data transmission costs incurred are also limited because only necessary portions of the content are downloaded, eliminating the transmission costs associated with unnecessary portions. Further, when implemented in conjunction with the above described cache algorithms, the downloadable content is not limited to the storage size of the mobile device.

The systems and methods described herein can further be implemented to optimize "trial" or "demonstration" content. These "demos" allow a user to try at least portions of content for free for a fixed or unlimited period of time before purchasing or downloading the full content. Traditionally, such demos are provided by allowing the user the download the entire content, but limiting execution to certain portions of the content. The entire content can be accessed and executed upon purchase of an activation key, for example, which unlocks the previously blocked portions of the content. This system provides various disadvantages, such as by requiring that a user download the entire content before allowing him or her to access only limited portions of it. Thus, more data than will be used in the trial is downloaded and stored, delaying the user's enjoyment of the trial beyond what is necessary. Further, a user who tries the demo and decides that he or she is not interested in the full content will have no use for the additionally downloaded content. In addition, the portions of blocked content can potentially be hacked into once they are downloaded, without purchase of an activation key.

Other demos are truncated versions of the downloadable content that contain only the data associated with the trial. Although these truncated versions eliminate the potential for hackers to access the full content, they require developers to create truncated content separate from the full content. Further, these types of demos still require a full download of all of the files associated with the trial, rather than just those particular demo files that will be needed in this particular run. If the user decides to purchase the full content, he or she may be required to re-download the portions of trial content despite the previous download, and may lose any saved progress or data associated with the trial content. Further, the user is still required to download the entire content upon purchase prior to execution.

By applying the embodiments described herein, however, no separate, truncated version of the content is required to provide a demo of the content to a user. For example, server 610 can have a single version of the content stored in memory 630, and that same version can be accessed to provide both trial and full portions of content to requesting devices. Further, the demo can begin execution without waiting for the demo or full content to be downloaded in its entirety.

In one embodiment, server 610 limits the portions of content (remotely requested or predicted) that are transmitted to user device 650 to only those portions of content identified as trial content. Further to the example described above, if FILE1.DAT is the only file associated with both trial and full content, then server 610 can respond to remote requests only for portions of the content corresponding to locations 0-9,999. If portions of the content outside of locations 0-9,999 are requested, server 610 can further transmit an error message (e.g., indicating that the requested content is outside of the trial, or that the trial is over), to user device 650. Server 610 can determine whether user device 650 should be given trial or full access using downloadable content metadata and/or downloadable content request metadata contained in memory 630.

In another embodiment, user device 650 itself limits the portions of content (locally requested or predicted) that are remotely requested from server 610. If FILE1.DAT is the only file associated with both trial and full content, then processor 680 can respond to local requests from application 660 only for portions of the content corresponding to locations 0-9,999. If portions of the content outside of locations 0-9,999 are requested, processor 680 can generate an error message (e.g., indicating that the requested content is outside of the trial, or that the trial is over), and provide it to application 660. Processor 680 can determine whether application 660 should be given trial or full access using downloadable content metadata and/or downloadable content request metadata contained in memory 690. Such metadata can be provided with digital rights management (DRM) protection or the like to prevent a user from tampering with the identification of the content as trial or full. It is contemplated that this embodiment can be combined with the above embodiment to provide two-way protection against hacking and stealing of unauthorized content.

In combination with either of the above embodiments (or in a separate embodiment), server 610 and/or user device 650 can be used to time-limit the execution of the demo. For example, server 610 and/or user device 650 can determine whether greater than an established amount of time has passed since an initial request for content was received. If server 610 and/or user device 650 receives a request outside of that amount of time, an error message can be generated indicating that the trial has ended. Thus, according to these embodiments, only the data needed by user device 650 to execute the trial (or a portion thereof) is downloaded to memory 690.

Although described with respect to the methods illustrated in FIGS. 1-5, it is understood that any of the methods described herein can be similarly performed. Further, although described with particular devices, it is understood that a variety of similar devices or modules may be employed to perform the processes described herein. The functions of these and other embodiments can be described as modules of computer executable instructions recorded on tangible media. The modules can be segregated in various manners over various devices.

Figure 7:
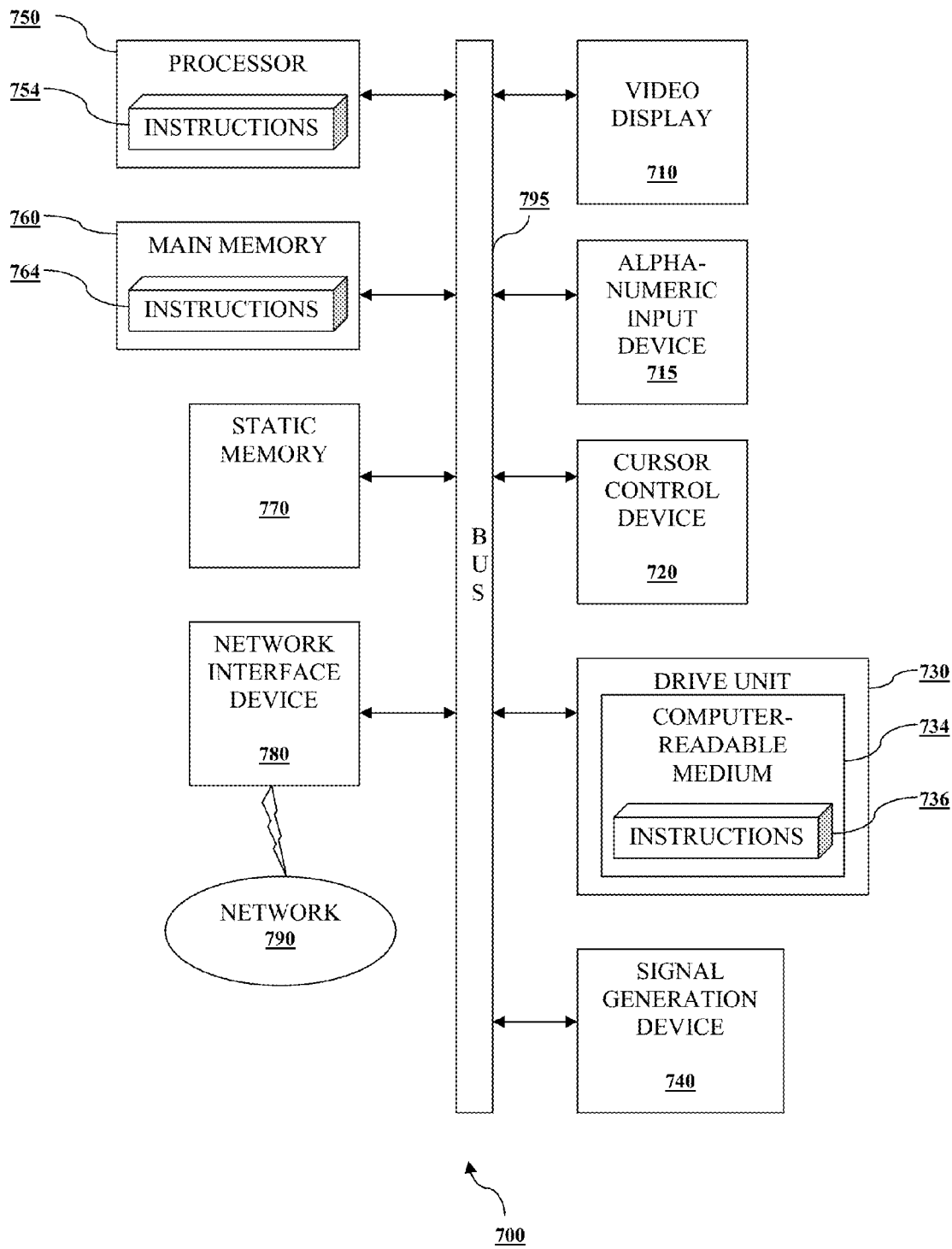
FIG. 7 is diagrammatic representation of a machine having a set of instructions for causing the machine to perform any of the one or more methods described herein.

FIG. 7 shows a diagrammatic representation of machine in the exemplary form of computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, as a host machine, or as a peer machine in a peer-to-peer (or distributed) network environment. The machine may be a personal computer (PC), a tablet, a set-top box (STB), a Personal Digital Assistant (PDA), a cellular telephone, a web appliance, a network router, switch or bridge, a game console, a television, a CD player, a DVD player, a BD player, an e-reader, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

According to some embodiments, computer system 700 comprises processor 750 (e.g., a central processing unit (CPU), a graphics processing unit (GPU) or both), main memory 760 (e.g., read only memory (ROM), flash memory, dynamic random access memory (DRAM) such as synchronous DRAM (SDRAM) or Rambus DRAM (RDRAM), etc.) and/or static memory 770 (e.g., flash memory, static random access memory (SRAM), etc.), which communicate with each other via bus 795.

According to some embodiments, computer system 700 may further comprise video display unit 710 (e.g., a liquid crystal display (LCD), a light-emitting diode display (LED), an electroluminescent display (ELD), plasma display panels (PDP), an organic light-emitting diode display (OLED), a surface-conduction electron-emitted display (SED), a nanocrystal display, a 3D display, or a cathode ray tube (CRT)). According to some embodiments, computer system 700 also may comprise alphanumeric input device 715 (e.g., a keyboard), cursor control device 720 (e.g., a mouse or controller), disk drive unit 730, signal generation device 740 (e.g., a speaker), and/or network interface device 780.

Disk drive unit 730 includes computer-readable medium 734 on which is stored one or more sets of instructions (e.g., software 736) embodying any one or more of the methodologies or functions described herein. Software 736 may also reside, completely or at least partially, within main memory 760 and/or within processor 750 during execution thereof by computer system 700, main memory 760 and processor 750. Processor 750 and main memory 760 can also constitute computer-readable media having instructions 754 and 764, respectively. Software 736 may further be transmitted or received over network 790 via network interface device 780.

While computer-readable medium 734 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the disclosed embodiments. The term "computer-readable medium" shall accordingly be taken to include, but not be limited to, solid-state memories, and optical and magnetic media.

It should be understood that processes and techniques described herein are not inherently related to any particular apparatus and may be implemented by any suitable combination of components. Further, various types of general purpose devices may be used in accordance with the teachings described herein. It may also prove advantageous to construct a specialized apparatus to perform the methods described herein. Those skilled in the art will appreciate that many different combinations of hardware, software, and firmware will be suitable for practicing the disclosed embodiments.

Embodiments of the present invention have been described in relation to particular examples, which are intended in all respects to be illustrative rather than restrictive. Further, while embodiments have been described in connection with a number of examples and implementations, it is understood that various modifications and equivalent arrangements can be made to the examples while remaining within the scope of the inventive embodiments.

Other embodiments of the invention will be apparent to those skilled in the art from consideration of the specification and practice of the embodiments disclosed herein. Various aspects and/or components of the described embodiments may be used singly or in any combination. It is intended that the specification and examples be considered as exemplary only, with a true scope and spirit of the disclosure being indicated by the following claims.

What is claimed is:

1. A method for optimizing transfers of downloadable content from a content provider to a processor, the method comprising:
   receiving a first local request for a first portion of a plurality of portions of the downloadable content that are to be executed by the processor;
   translating the first local request into a first remote request for the first portion of the downloadable content;
   transmitting the first remote request;
   receiving the first portion of the downloadable content;
   storing the first portion of the downloadable content;
   using the processor to execute the first portion of the downloadable content before other portions of the downloadable content are available for execution by the processor;
   determining if a second portion of the plurality of portions of the downloadable content should be obtained; and
   if it is determined that the second portion should be obtained,
      generating a request for the second portion,
      obtaining the second portion, and
      using the processor to execute the obtained second portion.

2. The method of claim 1, wherein generating a request for the second portion of the plurality of portions of the downloadable content comprises:

receiving a second local request for the second portion; and
determining whether the second portion is stored locally.

3. The method of claim 1, wherein generating a request for the second portion of the plurality of portions of the downloadable content comprises:
receiving a second local request for the second portion;
determining whether the second portion is stored locally; and
if the second portion is not stored locally:
translating the second local request into a second remote request for the second portion of the downloadable content;
transmitting the second remote request;
receiving the second portion of the downloadable content; and
storing the second portion of the downloadable content locally.

4. The method of claim 3, wherein the second portion of the downloadable content is received before or during the step of executing the first portion of the downloadable content.

5. The method of claim 3, further comprising:
generating an error message if the second portion of the downloadable content is not received before or during the step of executing the first portion of the downloadable content.

6. The method of claim 3, further comprising:
storing the first local request and the second local request chronologically as downloadable content request metadata.

7. The method of claim 1, further comprising:
storing the second portion of the downloadable content locally; and
executing the second portion of the downloadable content after executing the first portion of the downloadable content.

8. The method of claim 1, wherein generating a request comprises:
predicting a second local request for the second portion of the plurality of portions of the downloadable content.

9. The method of claim 8, wherein the second local request is predicted using at least one of the first local request, the first portion of the downloadable content, downloadable content metadata, and downloadable content request metadata.

10. The method of claim 1, wherein generating a request comprises
predicting a second remote request for the second portion of the plurality of portions of the downloadable content.

11. The method of claim 10, wherein the second remote request is predicted using at least one of the first local request, the first portion of the downloadable content, downloadable content metadata, and downloadable content request metadata.

12. A system for optimizing transfers of downloadable content, the system comprising:
a processor operable to:
receive a first local request for a first portion of a plurality of portions of the downloadable content;
translate the first local request into a first remote request for the first portion of the downloadable content;
transmit the first remote request over a network;
receive the first portion of the downloadable content over the network; and
execute the first portion of the downloadable content before other portions of the downloadable content are available for execution by the processor;
determine if a second portion of the plurality of portions of the downloadable content should be obtained; and
if it is determined that the second portion should be obtained,
generating a request for the second portion,
obtaining the second portion, and
execute the obtained second portion; and
a memory operable to store at least one portion of the plurality of portions of the downloadable content.

13. The system of claim 12, wherein generating a request for the second portion comprises:
receiving a second local request for the second portion; and
determining whether the second portion of the downloadable content is stored in the memory.

14. The system of claim 12, wherein generating a request for the second portion comprises:
receiving a second local request for the second portion of the plurality of portions of the downloadable content;
determining whether the second portion of the downloadable content is stored in the memory; and
if the second portion of the downloadable content is not stored in the memory:
translate the second local request into a second remote request for the second portion of the downloadable content;
transmit the second remote request over the network; and
receive the second portion of the downloadable content over the network.

15. The system of claim 14, wherein the processor is operable to receive the second portion of the downloadable content before or during execution of the first portion of the downloadable content.

16. The system of claim 14, wherein the processor is further operable to generate an error message if the second portion of the downloadable content is not received before or during execution of the first portion of the downloadable content.

17. The system of claim 14, wherein the memory is further operable to store a plurality of local requests chronologically as downloadable content request metadata.

18. The system of claim 12, wherein generating a request comprises predicting a second local request for the second portion of the plurality of portions of the downloadable content.

19. The system of claim 18, wherein the processor is operable to predict the second local request using one or more selected from the group consisting of (A) at least one of the plurality of portions of the downloadable content stored in the memory, (B) at least one of the plurality of local requests stored in memory, (C) downloadable content metadata, and (D) downloadable content request metadata.

20. The system of claim 12, further comprising:
a display coupled to the processor operable to display at least one portion of the plurality of portions of the downloadable content.

21. A non-transitory computer readable medium having computer executable instructions embedded thereon for performing the steps of:
receiving a first local request for a first portion of a plurality of portions of the downloadable content;
translating the first local request into a first remote request for the first portion of the downloadable content;
transmitting the first remote request;
receiving the first portion of the downloadable content;
storing the first portion of the downloadable content;
executing the first portion of the downloadable content before other portions of the downloadable content are available for execution;

determine if a second portion of the plurality of portions of the downloadable content should be obtained; and if it is determined that the second portion should be obtained,
generate a request for the second portion,
obtain the second portion, and
execute the obtained second portion.

22. The non-transitory computer readable medium of claim 21, wherein generating a request for the second portion of the plurality of portions of the downloadable content comprises:
receiving a second local request for the second portion; and
determining whether the second portion is stored locally.

23. The non-transitory computer readable medium of claim 21, wherein generating a request for the second portion of the plurality of portions of the downloadable content comprises:
receiving a second local request for the second portion;
determining whether the second portion is stored locally; and
if the second portion is not stored locally:
translating the second local request into a second remote request for the second portion of the downloadable content;
transmitting the second remote request;
receiving the second portion of the downloadable content; and
storing the second portion of the downloadable content locally.

24. The non-transitory computer readable medium of claim 23, wherein the second portion of the downloadable content is received before or during the step of executing the first portion of the downloadable content.

25. The non-transitory computer readable medium of claim 23 having computer executable instructions embedded thereon for further performing the step of:
generating an error message if the second portion of the downloadable content is not received before or during the step of executing the first portion of the downloadable content.

26. The non-transitory computer readable medium of claim 23 having computer executable instructions embedded thereon for further performing the step of:
storing the first local request and the second local request chronologically as downloadable content request metadata.

27. The non-transitory computer readable medium of claim 21, wherein generating a request for the second portion of the plurality of portions of the downloadable content comprises:
predicting a second local request for the second portion of the plurality of portions of the downloadable content.

28. The non-transitory computer readable medium of claim 27, wherein the second local request is predicted using at least one of the first local request, the first portion of the downloadable content, downloadable content metadata, and downloadable content request metadata.

29. A system for optimizing transfers of downloadable content from a content provider to an execution module, the system comprising:
a translation module operable to translate a first local request for a first portion of a plurality of portions of the downloadable content into a first remote request for the first portion of the downloadable content;
a communication module operable to receive the first local request, transmit the first remote request, and receive the first portion of the downloadable content;
an execution module operable to execute the first portion of the downloadable content before other portions of the downloadable content are available for execution by the execution module; and
a storage module operable to store at least one portion of the plurality of portions of the downloadable content; and
a query module operable to determine whether a second portion of the plurality of portions of the downloadable content should be obtained, the communication module further operable to obtain the second portion if it is determined it should be obtained, and the execution module further operable to execute the obtained second portion.

30. The system of claim 29, further comprising:
a query module operable to determine whether a second portion of the plurality of portions of the downloadable content is stored locally,
wherein the communication module is further operable to receive a second local request for the second portion of the downloadable content.

31. The system of claim 30, wherein the execution module is further operable to execute the second portion of the downloadable content if the second portion of the downloadable content is stored locally.

32. The system of claim 30, wherein if the second portion of the downloadable content is not stored locally:
the translation module is further operable to translate the second local request into a second remote request for the second portion of the downloadable content;
the communication module is further operable to transmit a second remote request, and receive the second portion of the downloadable content;
a prediction module operable to predict a second local request for a second portion of the plurality of portions of the downloadable content; and
the execution module is further operable to execute the second portion of the downloadable content after execution of the first portion of the downloadable content.

33. The system of claim 32, wherein the communication module is operable to receive the second portion of the downloadable content before or during execution of the first portion of the downloadable content by the execution module.

34. The system of claim 32, further comprising:
an error module operable to generate an error message if the second portion of the downloadable content is not received by the communication module before or during the execution of the first portion of the downloadable content by the execution module.

35. The system of claim 32, wherein the storage module is further operable to store a plurality of local requests chronologically as downloadable content request metadata.

36. The system of claim 32, wherein the prediction module is operable to predict the second local request using one or more selected from the group consisting of (A) at least one of the plurality of portions of the downloadable content stored in the memory, (B) at least one of the plurality of local requests stored in memory, (C) downloadable content metadata, and (D) downloadable content request metadata.

* * * * *